(12) United States Patent
Vishnu (10) Patent No.: US 7,304,945 B1
(45) Date of Patent: Dec. 4, 2007

(54) METHOD AND APPARATUS FOR DYNAMIC BITMAP GENERATOR SCHEDULER

(75) Inventor: Meenarachagan Vishnu, Cranberry, PA (US)

(73) Assignee: Ericsson AB, Stockholm (SE)

( * ) Notice: Subject to any disclaimer, the term of this patent is extended or adjusted under 35 U.S.C. 154(b) by 0 days.

(21) Appl. No.: 09/503,673

(22) Filed: Feb. 14, 2000

(51) Int. Cl.
*H04J 1/16* (2006.01)
*H04L 12/26* (2006.01)
*H04J 3/06* (2006.01)
*H04L 12/28* (2006.01)
*H04L 12/56* (2006.01)

(52) U.S. Cl. .................. 370/230; 370/229; 370/235; 370/351; 370/395.21; 370/395.4

(58) Field of Classification Search .......... 370/230, 370/230.1, 231, 235, 236, 389, 397, 398, 370/399, 395.2, 395.21, 395.3, 395.1, 395.43, 370/412
See application file for complete search history.

(56) References Cited

U.S. PATENT DOCUMENTS

| 5,561,663 | A | | 10/1996 | Klausmeier | |
| 5,742,772 | A | * | 4/1998 | Sreenan | 709/226 |
| 5,828,878 | A | * | 10/1998 | Bennett | 709/102 |
| 5,850,399 | A | * | 12/1998 | Ganmukhi et al. | 370/412 |
| 6,081,533 | A | * | 6/2000 | Laubach et al. | 370/421 |
| 6,167,445 | A | * | 12/2000 | Gai et al. | 709/223 |
| 6,314,098 | B1 | * | 11/2001 | Masuda et al. | 370/392 |
| 6,417,944 | B1 | * | 7/2002 | Lahat et al. | 359/124 |
| 6,438,134 | B1 | * | 8/2002 | Chow et al. | 370/412 |
| 6,449,274 | B1 | * | 9/2002 | Holden et al. | 370/392 |
| 6,504,819 | B2 | * | 1/2003 | Fowler et al. | 370/230 |

\* cited by examiner

*Primary Examiner*—Edan Orgad
*Assistant Examiner*—Blanche Wong
(74) *Attorney, Agent, or Firm*—Ansel M. Schwartz (57) ABSTRACT

A scheduler for a server. The scheduler includes a first level generator associated with groups of connections. The scheduler includes a second level generator associated with connections corresponding to the groups of connections. The first level generator identifying which connections in the second level generator corresponds to a group in the first level generator that is to be considered for service. The second level generator identifies the connections corresponding to the group to receive service from the server. The second level generator in connection with the first level generator. A method for scheduling service of a server. An apparatus for serving connections. The apparatus includes a hierarchical scheduler connected to the server. An apparatus for serving connections. The apparatus includes a scheduler connected to the server which schedules based on intercell intervals.

23 Claims, 9 Drawing Sheets

METHOD AND APPARATUS FOR DYNAMIC BITMAP GENERATOR SCHEDULER

FIELD OF THE INVENTION

The present invention is related to a bitmap scheduler. More specifically, the present invention is related to a hierarchical bitmap generator scheduler.

BACKGROUND OF THE INVENTION

Service scheduling is the primary mechanism for providing Quality of Service (QoS) guarantees on a per-VC basis in Asynchronous Transfer Mode (ATM) networks. Such service scheduling schemes must satisfy a number of requirements in order to be used in practical ATM switches and multiplexers. Firstly, such a service scheduling scheme must guarantee specified service rate to each virtual connection (VC), irrespective of the traffic patterns in the VCS. Secondly, the scheduling scheme must flexibly allocate excess (i.e., temporarily unused and unallocated) bandwidth among the active VCs. Thirdly, the outgoing traffic streams of each VC and VPs must be smooth (shaped) and not bursty. Fourthly, the service rate given to a VC or a group of VCs must not exceed a specified upper bound. Most importantly, the scheduling algorithm must be simple so that the scheduling decision can be performed using only a few operations per cell time.

Previously proposed schemes such as the Weighted Round Robin (WRR), Packetized Generalized Processor Sharing (PGPS) [A. K. Parekh and R. G. Gallager. A generalized processor sharing approach to flow control in integrated services networks: The single node case. *IEEE/ACM Transactions on Networking*, 1(3):344-357, June 1993; S. Demers, A. Keshav and S. Shenker. Analysis and simulation of a fair queuing algorithm. *Internet Research and Experience*, 1, 1990, incorporated by reference herein], Self-Clocked Fair Queueing (SCFQ) [S. J. Golestani. A self-clocked fair queuing scheme for broadband applications. In *Proceedings of IEEE INFOCOM*, pages 636-646, June 1994, incorporated by reference herein], Worst Case Fair Weighted Fair Queueing (WF2Q) [C. R. Bennet and H. Zhang. WF$^2$Q: Worst-case fair weighted fair queuing. In *Proceedings of IEEE INFOCOM*, pages 120-128, 1996, incorporated by reference herein], and Virtual Clock [L. Zhang. Virtualclock: A new traffic control algorithm for packet switched networks. *ACM Transactions on Computer Systems*, 9(2):101-124, May 1991, incorporated by reference herein] have either fallen short of these goals or are too complex to be implemented in high speed hardware cost-effectively.

SUMMARY OF THE INVENTION

The present invention pertains to a scheduler for a server. The scheduler comprises a first level generator associated with groups of connections. The scheduler comprises a second level generator associated with connections corresponding to the groups of connections. The first level generator identifying which connections in the second level generator corresponds to a group in the first level generator that is to be considered for service. The second level generator identifies the connections corresponding to the group to receive service from the server. The second level generator in connection with the first level generator.

The present invention pertains to a method for scheduling service of a server. The method comprises the steps of identifying a group of connections with a first level generator to receive service from the server. Then there is the step of identifying connections corresponding with the group of connections with a second level generator to receive service from the server.

The present invention pertains to an apparatus for serving connections. The apparatus comprises a server. The apparatus comprises a memory in which data of the connections is stored. The memory is connected to the server. The apparatus comprises a hierarchical scheduler connected to the server which schedules when the data of the connections in the memory is to receive service from the server. The scheduler is connected to the server and the memory.

The present invention pertains to an apparatus for serving connections. The apparatus comprises a server. The apparatus comprises a memory in which cells of the connections are stored. The memory is connected to the server. The apparatus comprises a scheduler connected to the server which schedules when the cells of the connections in the memory are to receive service from the server based on intercell intervals, wherein an intercell interval is how long the server takes to service a cell. The scheduler is connected to the server and the memory.

BRIEF DESCRIPTION OF THE DRAWINGS

In the accompanying drawings, the preferred embodiment of the invention and preferred methods of practicing the invention are illustrated in which.

DETAILED DESCRIPTION

Figure 10:
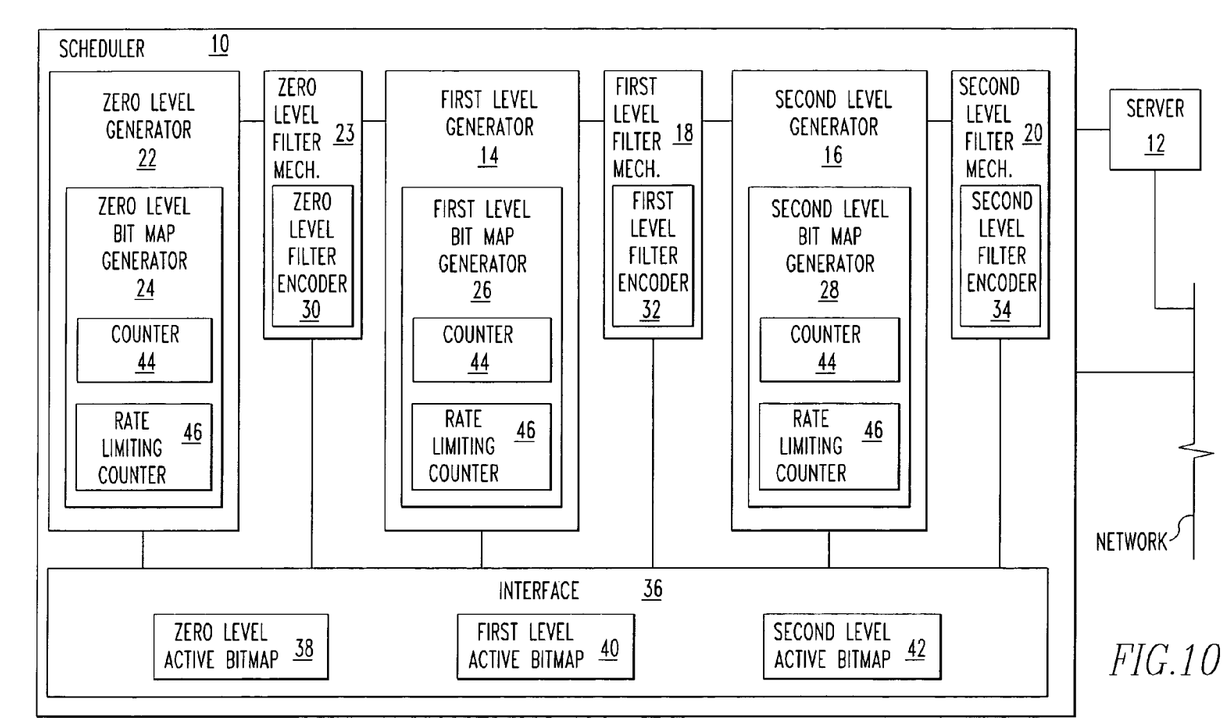
FIG. 10 is a schematic representation of a scheduler of the present invention.

Referring now to the drawings wherein like reference numerals refer to similar or identical parts throughout the several views, and more specifically to FIG. 10 thereof, there is shown a scheduler 10 for a server 12. The scheduler 10 comprises a first level generator 14 associated with groups of connections. The scheduler 10 comprises a second level generator 16 associated with connections corresponding to the groups of connections. The first level generator 14 identifying which connections in the second level generator 16 corresponds to a group in the first level generator 14 that is to be considered for service. The second level generator 16 identifies the connections corresponding to the group to receive service from the server 12. The second level generator 16 in connection with the first level generator 14.

Preferably, the scheduler 10 includes a first level filter mechanism 18 which filters out inactive groups of connections. The first level filter mechanism 18 is connected to the first level generator 14 and the second level generator 16. The scheduler 10 preferably includes a second level filter mechanism 20 which filters out inactive connections. The second level filter mechanism 20 is connected to the second level generator 16. Preferably, the scheduler 10 includes a zero level generator 22 associated with supergroups corresponding with groups. The zero level generator 22 in connection with the first level generator 14. The zero level generator 22 identifying which groups in the first level generator 14 correspond to a supergroup in the zero level generator 22 that are considered for service.

The scheduler 10 preferably includes a zero level filter mechanism 23 which filters out inactive supergroups. The zero level filter mechanism 23 is connected to the zero level generator 22 and the first level generator 14. Preferably, the zero level generator 22 includes a zero level bitmap generator 24 which generates a zero level schedule bitmap which indicates the supergroup to be scheduled for service, the first level generator 14 includes a first level bitmap generator 26 which indicates the group to be scheduled for service, and the second level generator 16 includes a second level bitmap generator 28 which generates a second level schedule bitmap which indicates the connections to be scheduled for service.

The zero level, first level and second level filter mechanism 20 preferably includes a zero level filter encoder 30, first level filter encoder 32 and second level filter encoder 34, respectively, which filters out inactive supergroups from the zero level schedule bitmap and encodes the zero level schedule bitmap with inactive supergroups removed, which filters out inactive groups from the first level schedule bitmap and encodes the first level schedule bitmap with inactive groups removed, and which filters out inactive connections from the second level schedule bitmap and encodes the second level schedule bitmap with inactive connections removed, respectively. Preferably, the scheduler 10 includes an interface 36 which maintains a zero level active bitmap 38, a first level active bitmap 40 and a second level active bitmap 42 having only active connections corresponding to the zero level schedule bitmap, first level schedule bitmap and second level schedule bitmap, respectively. Preferably, each active bitmap has a bit which is set to 1 when an associated connection is active and is set to 0 when an associated connection is inactive.

The zero level filter encoder 30 preferably reads the zero level schedule bitmap and ANDS it with the zero level active bitmap 38 to filter out inactive supergroups, the first level filter encoder 32 reads the first level schedule bitmap and ANDS it with the first level active bitmap 40 to filter out inactive groups, and the second level filter encoder 34 reads the second level schedule bitmap and ANDS it with the second level active bitmap 42 to filter out inactive supergroups. Preferably, the zero level bitmap generator 24, first level bitmap generator 26 and second level bitmap generator 28 dynamically generates bits for each supergroup, group and connection, respectively.

The zero level bitmap generator 24 preferably includes a counter 44 for each supergroup which is decremented as a function of an intercell interval, wherein the intercell interval is the time it takes for the server 12 to service a cell, the first level bitmap generator 26 includes a counter 44 for each group which is decremented as a function of the intercell interval, and the second level bitmap generator 28 includes a counter 44 for each connection which is decremented as a function of the intercell interval. Preferably, the zero level bitmap generator 24 sets a bit for a supergroup whose counter 44 decrements to zero, the first level bitmap generator 26 sets a bit for a group whose counter 44 decrements to zero, and the second level bitmap generator 28 sets a bit for a connection whose counter 44 decrements to zero. Alternatively, each counter at each level has a different number of bits.

The zero level bitmap generator 24, first level bitmap generator 26 and second level bitmap generator 28 each preferably include a rate limiting counter 46 associated with each counter 44, wherein the bit for the supergroup, group or connection, respectively, is set whenever both the counter 44 and the corresponding rate limiting counter 46 decrements to zero. Preferably, the zero level bitmap generator 24, first level bitmap generator 26 and second level bitmap generator 28 each generate a guaranteed rate bitmap for supergroups, groups and connections, respectively, which receive service before any other supergroups, groups or connections, respectively, in the respective schedule bitmaps. The zero level bitmap generator 24, first level bitmap generator 26 and second level bitmap generator 28 preferably proportionately reduce the service to each supergroup, group and connection, respectively, when overbooking occurs.

Preferably, connections arise from entities, and alternatively, the apparatus includes multiple counters associated with each entity which have multiple bits, including multiple schedule bitmaps associated with each entity that are used to schedule connections from the corresponding entity at different priorities or a combination of priorities.

The present invention pertains to a method for scheduling service of a server 12. The method comprises the steps of identifying a group of connections with a first level generator 14 to receive service from the server 12. Then there is the step of identifying connections corresponding with the group of connections with a second level generator 16 to receive service from the server 12.

Preferably, after the identifying the group of connections step, there is the step of filtering out inactive groups of connections in regard to the first level generator 14. After the identifying the connections step, there is the step of filtering out inactive connections in regard to the second level generator 16. Preferably, before the step of identifying the group of connections, there is the step of identifying groups in the first level generator 14 corresponding to a supergroup and a zero level generator 22.

After the identifying groups step, there is preferably the step of filtering out inactive supergroups of connections in regard to the zero level generator 22. Preferably, the filtering out the inactive supergroups step includes the step of ANDing a zero level schedule bitmap of the zero level bitmap generator 24 with a zero level active bitmap 38 of an interface 36 to filter out inactive supergroups. The filtering out the inactive groups step preferably includes the step of ANDing a first level schedule bitmap of the first level bitmap generator 26 with a first level active bitmap 40 of an interface 36 to filter out inactive groups.

Preferably, the filtering out the inactive connections step includes the step of ANDing a second level schedule bitmap of the second level bitmap generator 28 with a second level active bitmap 42 of an interface 36 to filter out inactive connections. The identifying the groups of connections step preferably includes the step of generating dynamically the zero level schedule bitmap, the identifying the group step includes the step of generating dynamically the first level schedule bitmap, and the identifying the connections step includes the step of generating dynamically the second level generator 16 schedule bitmap. Preferably, the step of generating the zero level schedule bitmap includes the step of decrementing a counter 44 for each supergroup every intercell interval; the step of generating the first level schedule bitmap includes the step of decrementing a counter 44 for each group every intercell interval; the step of generating the second level schedule bitmap includes the step of decrementing a counter 44 for each connection every intercell interval.

Figure 11:
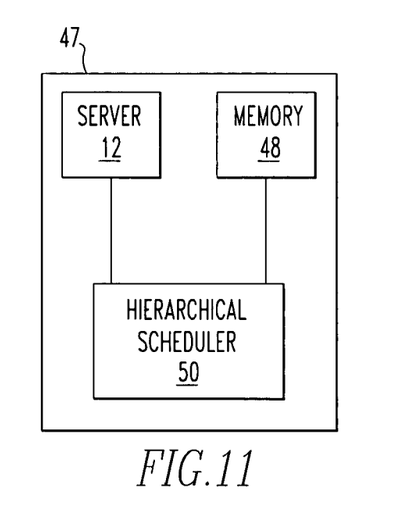
FIG. 11 is a schematic representation of an apparatus of the present invention.

The present invention pertains to an apparatus 47 for serving connections, as shown in FIG. 11. The apparatus 47 comprises a server 12. The apparatus 47 comprises a memory 48 in which data of the connections is stored. The memory 48 is connected to the server 12. The apparatus 47 comprises a hierarchical scheduler 50 connected to the server 12 which schedules when the data of the connections in the memory 48 is to receive service from the server 12. The scheduler 50 is connected to the server 12 and the memory 48.

Figure 12:
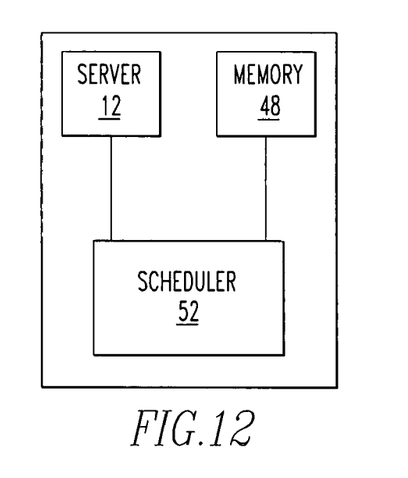
FIG. 12 is a schematic representation of an apparatus of the present invention.

The present invention pertains to an apparatus 49 for serving connections, as shown in FIG. 12. The apparatus 49 comprises a server 12. The apparatus 49 comprises a memory 48 in which cells of the connections are stored. The memory 48 is connected to the server 12. The apparatus 49 comprises a scheduler 52 connected to the server 12 which schedules when the cells of the connections in the memory 48 are to receive service from the server 12 based on intercell intervals, wherein an intercell interval is how long the server 12 takes to service a cell. The scheduler 52 is connected to the server 12 and the memory 48.

Preferably, the intercell intervals are inversely proportional to bandwidth allocated to a connection. Spacing at intercell intervals of cells is performed preferably by either statically storing a set of schedule bitmaps or by dynamically generating the schedule bitmap specifying which connections are to be served.

In the operation of the preferred embodiment, the scheduler 10 describes a service scheduling scheme and its implementation for high-speed ATM switches and multiplexers. The scheduling scheme satisfies all of the following required properties. Moreover, the scheduling scheme can be implemented in high-speed hardware cost-effectively.

Minimum Specified Bandwidth Guarantee. Once a VC is admitted, an ATM scheduling scheme must guarantee a minimum specified bandwidth to each VC, irrespective of the traffic streams sharing the link. This is crucial for the ATM networks to guarantee specified QoS such as bounds on cell delay and cell loss rate on a per-VC basis.

Hierarchical Shaping. The outgoing VC streams must be smooth and not bursty. Bursty VC streams require larger buffer space in downstream nodes and increase both the cell loss rate and the cell delay variation. Hierarchical shaping is desirable when VPs are considered as a single entity in downstream switching nodes.

Hierarchical Rate Limiting. In some scenarios, the service rate of a VC or a group of VCS must be upper bounded, as well. For example, if the VC or the group of VCS passes through a leased line of limited bandwidth, then the VC or VP needs to have an upper bound on the bandwidth it receives at the switch port.

Overbooking. Several service providers like to overbook their lines because they observe that their lines are usually underutilized. From a scheduler 10 point of view, overbooking means that the sum of the bandwidth of the admitted VCS can be greater than the link bandwidth and when there is congestion, the link bandwidth be shared proportional to the requested bandwidth.

Overbooking with Minimum Guarantees. Degradation in service rate with overbooking may not be acceptable to some time sensitive services such as CBR and rt-VBR. Such VCS must be guaranteed their specified bandwidth, while other VCS overbook their bandwidth.

Flexible and Dynamic Adjustment of Excess Bandwidth Allocation. It is desirable to dynamically adjust the allocated bandwidth. This is useful, for example, to change the bandwidth allocation to Available Bit Rate (ABR) VCS depending on the computed explicit rate (ER) values.

Fast VC Setup/Teardown. Initializing the scheduler 10 at VC setup/VC teardown must not involve more than few accesses of the memory 48 mapped registers of the scheduler 10. If the scheduler 10 requires the initialization of large data structures when VCS are setup/torn down, then the setup/teardown time is considerably increased.

Figure 1:
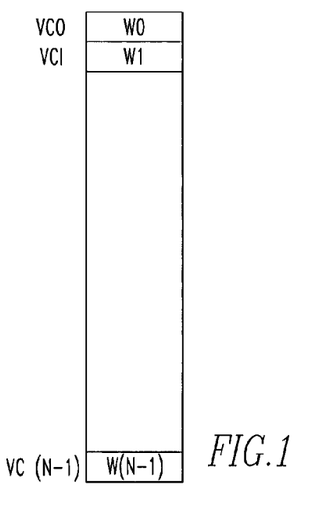
FIG. 1 shows weighted Round Robin weights.

To better understand the scheme, consider a one-dimensional array of WRR scheduler 10 weights indexed by the VC number as shown in FIG. 1. The software calculates the weight of the ith VC as follows:

$$w_i = \frac{\text{MAX\_WEIGHT} \times r_i}{R} \tag{1}$$

where MAX_WEIGHT is 256 and $r_i$ is the bandwidth requested by the ith VC and R is the line rate.

Figure 2:
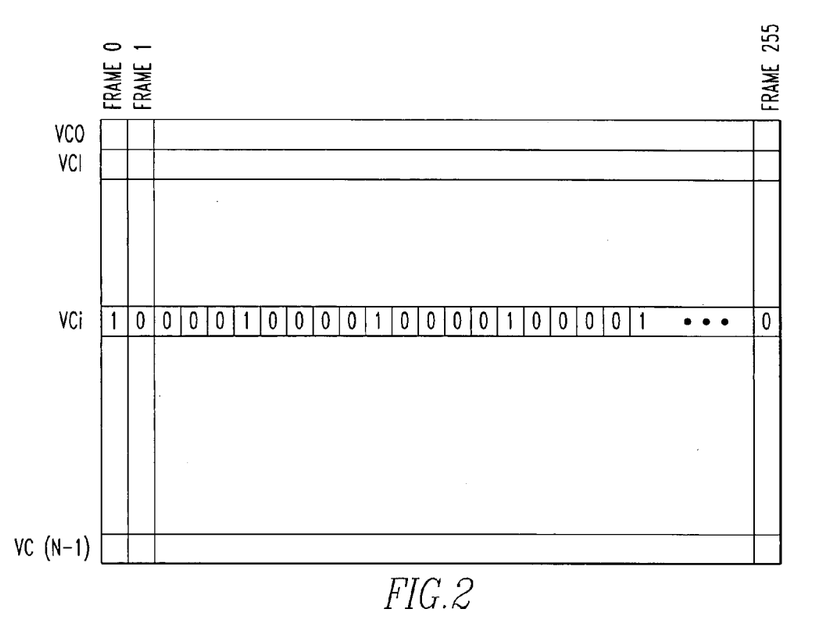
FIG. 2 shows a bitmap array.

As noted above, one of the problems with the WRR scheduler 10 is that the outgoing VC streams are bursty, because WRR sends bursts of $w_i$ cells from the ith VC. One way to make the outgoing VC streams smooth is the replace the one-dimensional array with a two-dimensional array of bits as shown in FIG. 2.

Suppose that the ith VC had a weight of $w_i$. Divide 256 by $w_i$ to obtain its inter-cell interval, $D_i$ in slots. Set every $D_i$th bit of the ith row to 1 and the remaining bits of the row to 0.

The operation of this bitmap scheduler 10 is as follows: The column 0 of the bits is first read and the VCS corresponding to the bits set to '1' are served. This is follows by the column 1, 2, . . . up to column 255. The cycle again starts with column 0.

There are at least three problems with this solution. The first is that it requires enormous amount of memory 48. To support 256K VCS, 256K×256 bits of RAM is required. (Assuming a width of 256 bits is sufficient. Currently switch software sets the maximum weight in the WRR scheduler 10 to 256). Secondly, VC setup/teardown requires 256 memory 48 writes which will inevitably slow down VC setup/teardown times. The third problem is that the scheduler 10 may be spending time reading large numbers of empty VCS.

Figure 3:
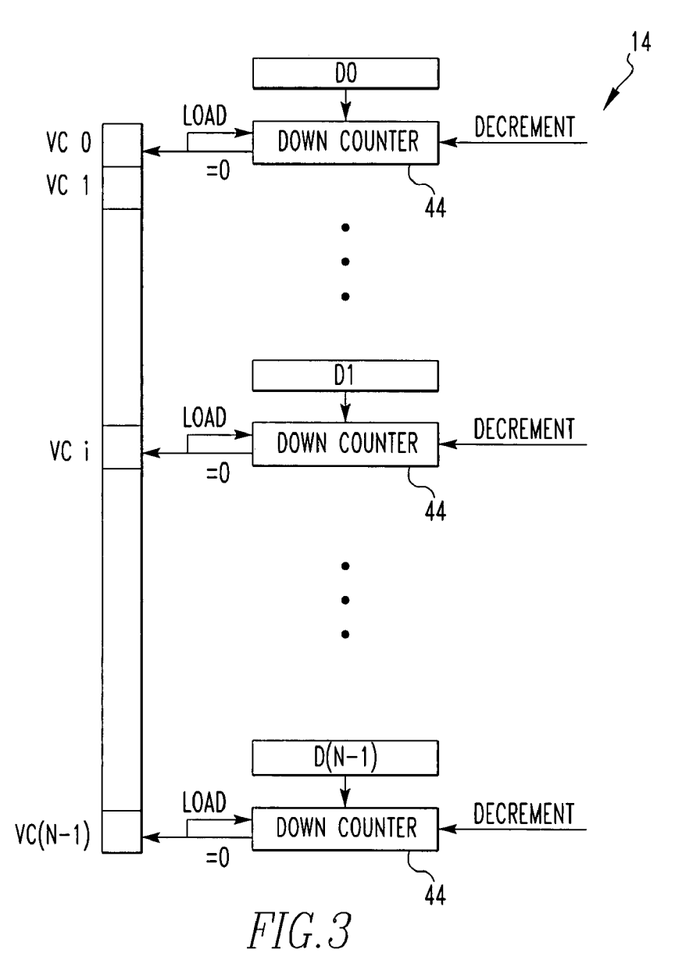
FIG. 3 shows dynamic bitmap generation.

The first problem can be solved by dynamically generating bits for each VC rather than storing precomputed bit patterns. The bit pattern corresponding to the ith VC is simple. Each $D_i$th bit is set. This can be done by having a down computer as shown in FIG. 3. The counter 44 corresponding to the ith VC is loaded with the value $D_i$ and the ith VC bit is set when the counter 44 counts down to zero, at which point the counter 44 is reloaded with the value of $D_i$.

This solution also solves the second problem, because now the ith VC setup only requires the initialization of the intercell interval, $D_i$. That is, it requires only one memory 48 access.

Figure 4:
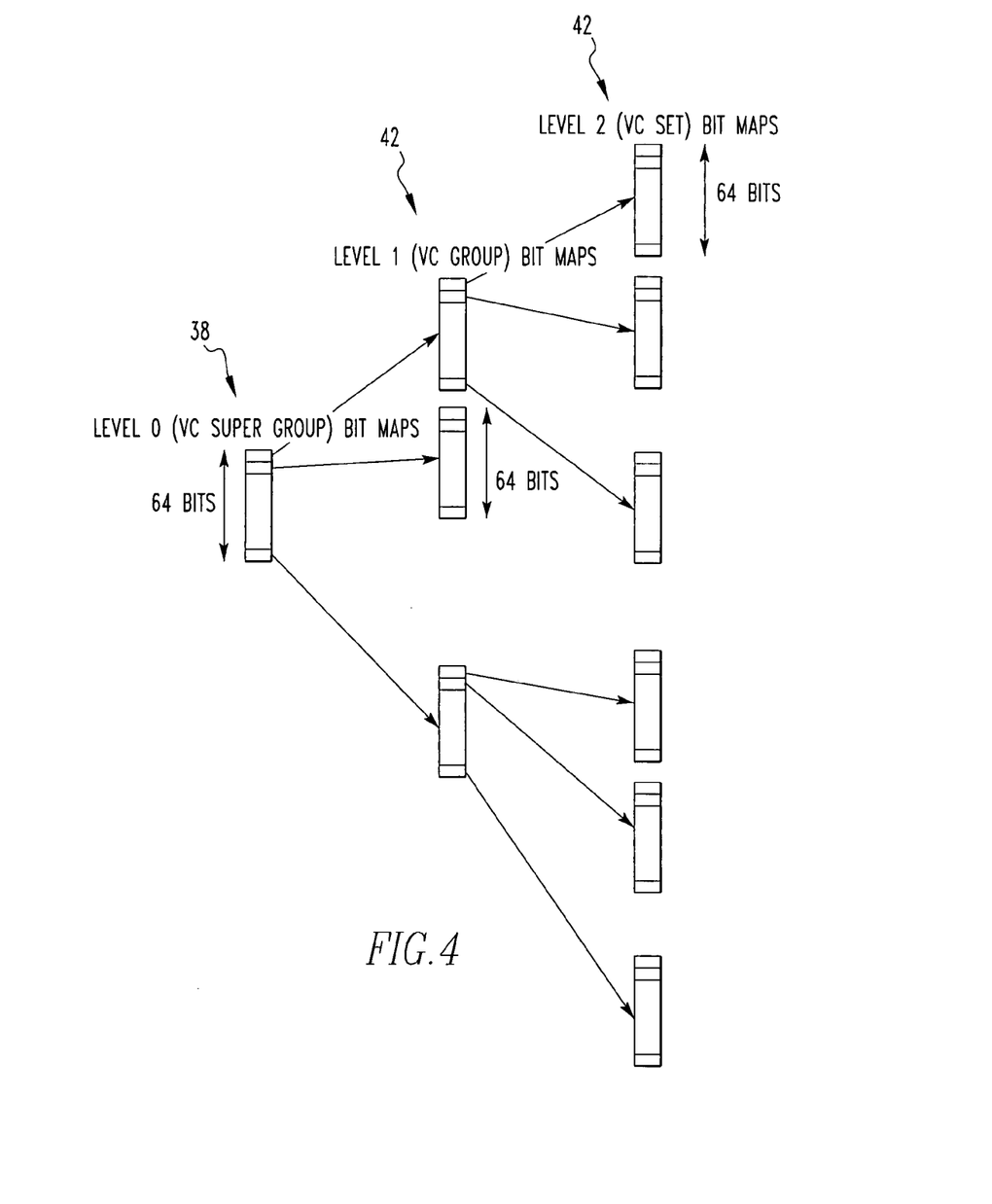
FIG. 4 shows a dynamic bitmap hierarchy.

To solve the third problem and to avoid the large number of counters 44, registers and logic needed, the bitmaps are organized as a hierarchy as shown in FIG. 4.

Figure 5:
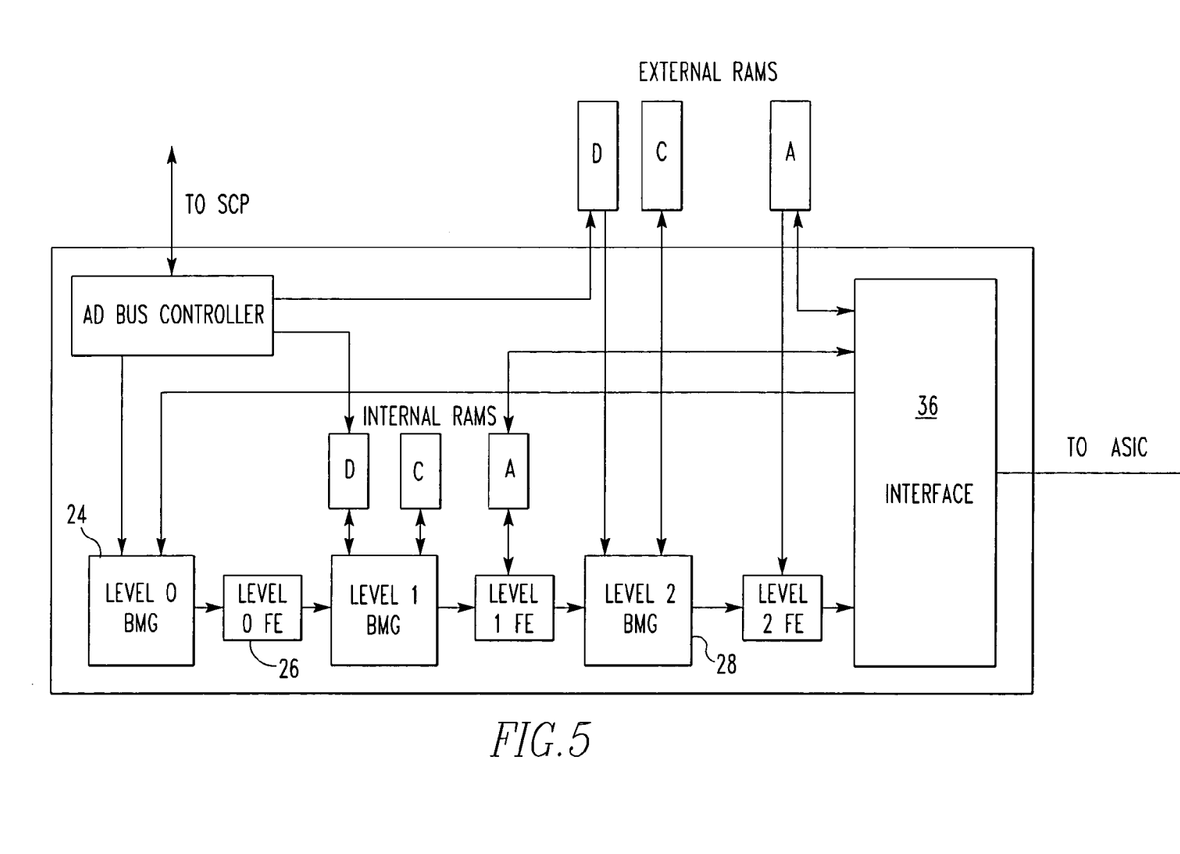
FIG. 5 is a schematic representation of a hierarchical dynamic bitmap generator scheduler.

The Hierarchical Dynamic Bitmap Generator (HDBMG) is shown in FIG. 5. The scheduler 10 consists of the following components: three Bitmap Generators (BMGs), three Filter-Encoder (FEs), Trident Interface (TI) and AD Bus Controller. The VCS are organized into a three level hierarchy, consisting of 256K (64×64×64) VCS, 4K (64×64) VC groups and 64 VC supergroups. In other words, ith VC group consists of VCS 64i to 64i+63 and jth VC supergroup consists of VC groups 64j to 64j+63.

The level 0 (level 1, level 2) BMG generate schedule bitmaps which indicate the VC supergroup (VC groups, VCS) to be scheduled at each slot. The bitmap is generated using the intercell interval (D) and the current counter (C) values stored in registers (internal RAMs, external RAMs). The level 0 (level 1, level 2) FE filters out inactive VC supergroups and encodes the resulting bitmap to determine VC supergroups (VC groups, VCS) to be scheduled.

The bitmap generated by level 0 BMG is placed into a FIFO within the BMG. The level 0 FE pops the bitmaps, filters out inactive VC supergroups and encodes the resulting bitmap into a list of VC supergroup numbers as shown in FIG. 5. The level 1 BMG obtains the next VC supergroup number from the level 0 FE, reads the corresponding data (intercell interval and current counter values) from the internal RAMs, generates the VC group bitmap and stores it in a FIFO. The level 1 FE pops the next bitmap, filters out inactive VC groups, and encodes the resulting bitmap into a list of VC groups. Similarly, the level 2 generates VC bitmaps and level 2 FE filters out inactive VCS and encode the bitmaps into a list of VCS which are sent to the Trident Interface.

The BMGs generates schedule bitmaps which indicate which VCS (VC groups or VC supergroups) are scheduled at the current slot. The level 0 BMG is the simplest. It does not need any external RAM because it only handles a single set of 64 VC supergroups. The data (D and C) can be stored in registers within the level 0 BMG. The operation of the level 0 BMG. The operation of the level 0 BMG is as follows: At each clock cycle, if its bitmap FIFO is not full, it decrements all the 64 counters. If any of them have reached zero, then those counters are reloaded with the corresponding value of D. Also, the bits corresponding these VC supergroups are set to 1 in the schedule bitmap and pushed into the FIFO. Note that the bits corresponding to the VC supergroups whose counters have not reached zero are set to 0.

Figure 6:
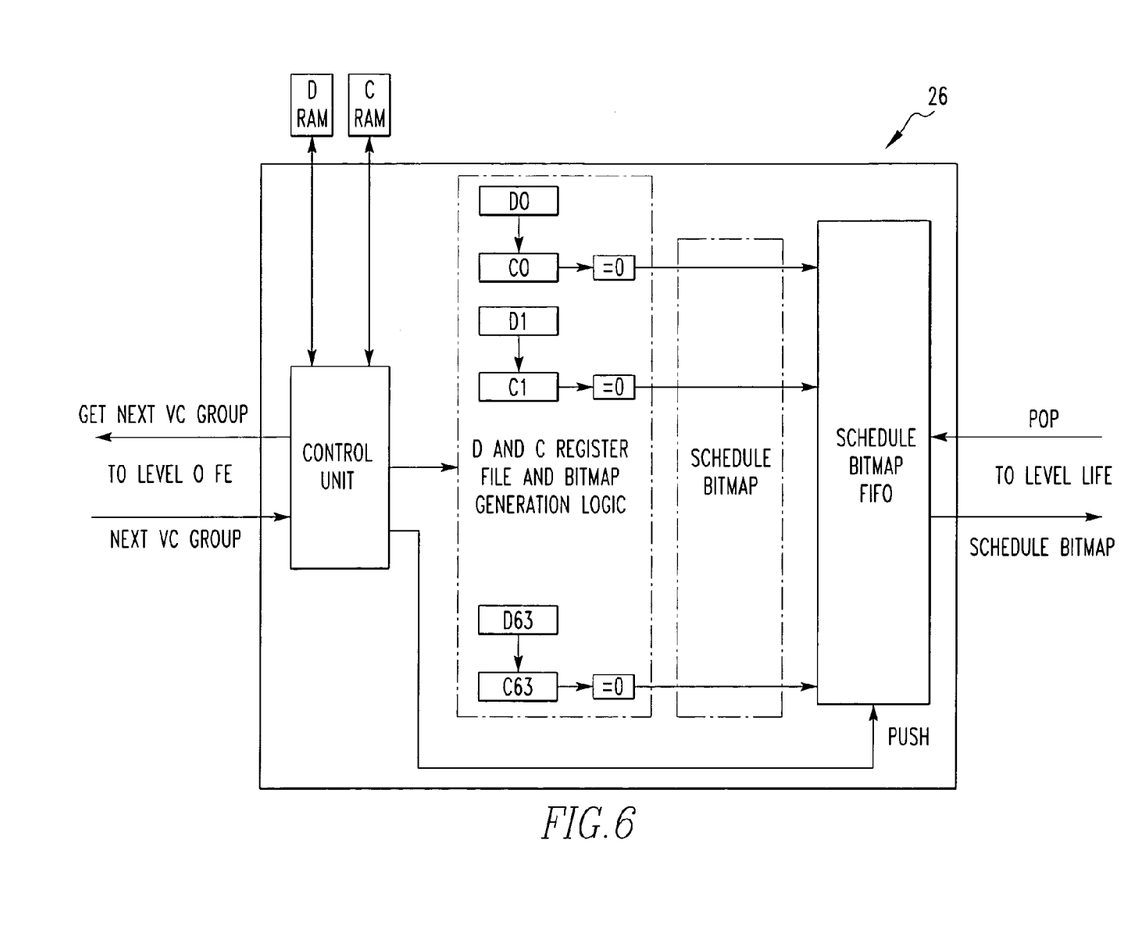
FIG. 6 is a schematic representation of a level 1 bitmap generator.

The operation of the level 1 BMG is slightly more complex (see FIG. 6). As described above, the bitmaps generated by the level 0 BMG are placed in a FIFO. The level 0 filter-encoder (FE) pops these bitmaps, filters out inactive VC supergroups and encodes the set bits of the resulting bitmap into a list of VC supergroups. The details of the operation of the FE are described below. The level 1 BMG has a similar organization as the level 0 BMG. In addition, it is connected to RAMs which contains the interval (D) and the counter values of the 4K (64×64) VC groups. The operation of the level 1 BMG is as follows: A level 1 BMG requests and gets the next VC supergroup number from the level 0 FE. It reads the set of 64 D and C values of the 64 VC groups belong to the received VC supergroup. The level 1 BMG then computes the schedule bitmap and puts it in a FIFO. In fact, a (64+6)-bit wide word containing the 64-bit wide bitmap plus the 6-bit wide VC supergroup number is put into the FIFO. Note that the operations such as accessing the next VC supergroup number, accessing data from the RAMs, computing the bitmap and writing back the updated counter values to the RAM can be pipelined to generate a schedule bitmap at every clock cycle (as long as the FIFO is not full).

The operation of the level 2 BMG is almost identical to the level 1 BMG. The RAMs connected to the level 2 BMGS are considerably larger, containing the interval and counter values of the 256K (64×64×64) VCS. The level 1 FE pops the level 1 BMGS FIFO, filters out inactive VC groups and encodes the resulting bitmap into a list of VC groups. The complete VC group number is obtained by concatenating the 6-bit VC supergroup number attached to the bitmap with the 6-bit indicating the position of the bit in the bitmap. That is, the output of the level 1 FE, is a list of 12-bit wide words indicating which of the 4K VC groups are to be scheduled. The level 2 BMG requests and received these 12-bit VC group number, reads the corresponding set of intervals and counter values of the 64 VCS, generates the bitmap and puts the bitmap into a FIFO. As done by the level 1 BMG, the level 2 BMG also attaches the 12-bit VC group number with the generated bitmap. Therefore, the total width of the words pushed into the level 2 BMGs FIFO is (64+12=75)-bits.

The level 2 FE, pops these bitmaps, filters out inactive VCS and encode the bitmaps into a list of VCS to be scheduled. Note that the 18-bit numbers indicating subset of possible 256K VCS are obtained by concatenating 12-bit VC group numbers attached to the bitmap with the 6-bit indicating the position of the bit in the bitmap.

The scheduler 10 employs three filter-encoders (FEs) The level 0 FE pops the bitmap FIFO of level 0 BMG, filters out inactive VC supergroups from the bitmap and encodes the resulting bitmap into a list of VC supergroup numbers. As described in Subsection 3.5, the Trident Interface maintains a hierarchical bitmaps of the active VCS, i.e., VCS which have cells in their per-VC queues. These bitmaps are referred to as active bitmaps to avoid confusion with the schedule bitmaps. The level 0 (level 1, level 2) FE reads the corresponding active bitmaps and ANDs it with the schedule bitmaps to filter out inactive VC supergroups (VC groups, VCS).

Figure 7:
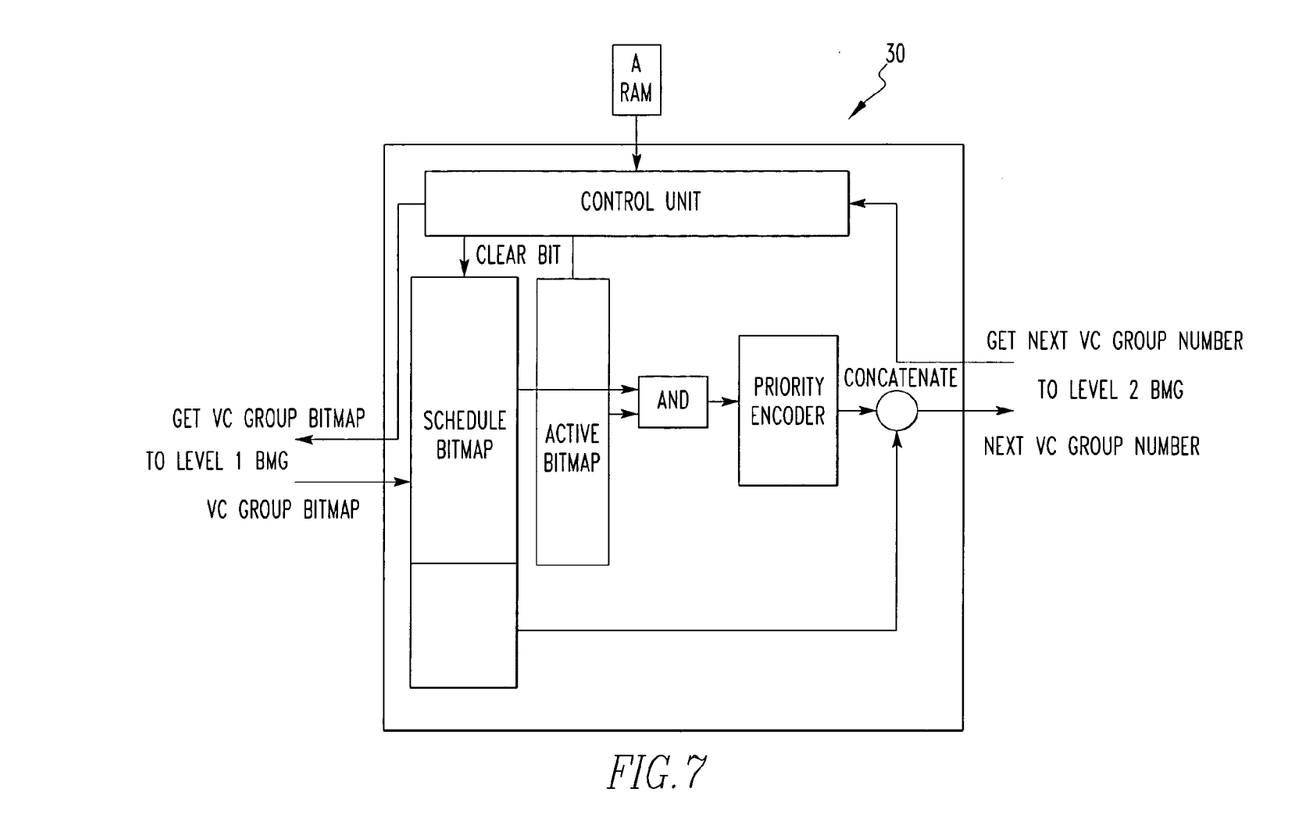
FIG. 7 is a schematic representation of a level 1 filter-encoder.

FIG. 7 shows the level 1 FE. It requests and gets the VC group schedule bitmap from the level 1 BMG. It then reads the active bitmap of the VC supergroup. Note that the VC supergroup number is attached to the bitmap. The FE filters out inactive VC groups by ANDing the schedule bitmap with the active bitmap. Finally, a priority encoder converts the most significant active bit of the resulting bitmap to VC group number. When the get next VC group number signal is asserted by the level 2 BMG, the most significant active bit is cleared and the priority encoder encodes the next most significant active bit. If there are no more active bits, then, a new set of bitmaps is loaded and used to encode the next VC group number.

The Trident Interface (TI) forms the interface 36 to the Trident ASIC. It receives a cell arrival information from the Trident ASIC and maintains the three level hierarchical active bitmaps. The Trident ASIC informs the port to schedule and the TI gets the next VC from the level 2 FE and sends it to the Trident ASIC. Trident products are available from FORE Systems, Inc., Warrendale, Pa.

The AD bus controller provides an interface 36 to the Switch Control Processor (SCP) to access internal registers, internal and external RAMS to set up and tear down VCS. The control and status registers are memory-mapped to the address space of the SCP.

As mentioned above, it is desirable to have two types of bandwidth allocations, overbookable bandwidth and guaranteed bandwidth. That is, the bandwidth of a VC is specified as the following 3-tuples ($r_g$, $r_e$, $r_{max}$), where $r_g$ is the bandwidth to be guaranteed, $r_e$ is the additional excess bandwidth to be allocated (subject to availability) and $r_{max}$ is the maximum rate at which to serve the VC. Usually, no upper bounding is necessary and the default $r_{max}$ is the line rate, L. The CAC must ensure that $\Sigma r_g \leq L$. However, $\Sigma(r_g + r_e)$ can be greater than L. This is called bandwidth overbooking.

Figure 8:
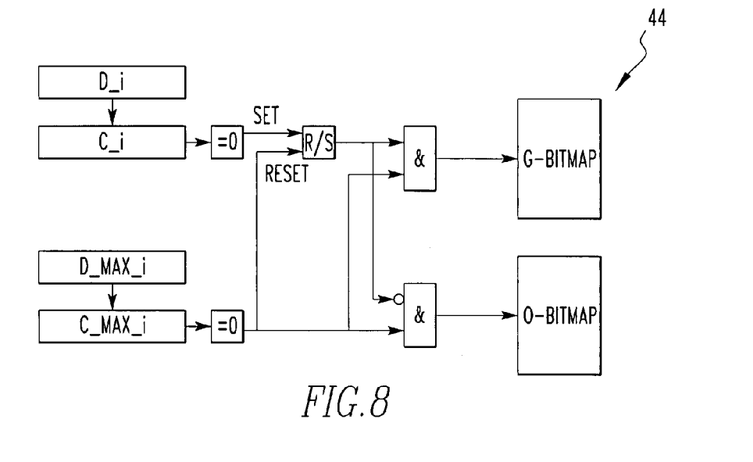
FIG. 8 is a schematic representation of a counter.
Figure 9:
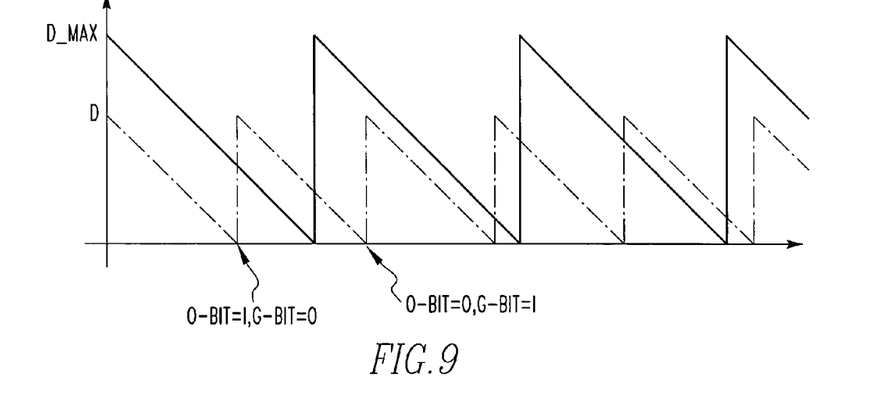
FIG. 9 is a graph of how to schedule overbookable and guaranteed bandwidth.

It is now described how the Dynamic Bitmap Generator scheduler 10 can be enhanced to provide overbookable and guaranteed bandwidths. As shown in FIGS. 8 and 9, the BMG generates two bitmaps, G-bitmap (guaranteed rate bitmap) and the O-bitmap (overbookable rate bitmap) simultaneously. The O-bit (G-bit) of a VC (VC group or VC supergroup) is set when the counter 44 (FIG. 8) loaded with the overbookable rate interval hits zero before (after) the counter 44 loaded with the guaranteed rate interval hits zero as shown in FIG. 9. The two bitmaps are put into two separate FIFOs, the G-FIFO and the O-FIFO, respectively. The frame number (or the inter-frame number) is included in the G-bitmap and is used to determine how many of the bits of the O-bitmap is selected at each frame.

The rate-limiting is implemented by having a register which stores the next eligible transmission slot. The next eligible transmission slot is equal to the last transmission slot plus $D_{min}=1/r_{max}$. The current slot number is compared with the next eligible transmission slot and if the current slot number is less, then bitmap is inhibited. Otherwise, the bitmap is set and the next eligible transmission slot is loaded with a value equal to current slot number plus $D_{min}$.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A scheduler for a server comprising:
   a first level generator associated with groups of connections;
   a second level generator associated with connections corresponding to the groups of connections, said first level generator identifying which connections in the second level generator corresponds to a group in the first level generator that are to be considered for service, said second level generator identifies the connections corresponding to the group to receive service from the server, said second level generator in connection with said first level generator;
   a first level filter mechanism which filters out inactive groups of connections, said first level filter mechanism connected to the first level generator and the second level generator;
   a second level filter mechanism which filters out inactive connections, said second level filter mechanism connected to the second level generator; and
   a zero level generator associated with supergroups corresponding with groups, said zero level generator in connection with the first level generator, said zero level generator identifying which groups in the first level generator correspond to a supergroup in the zero level generator that are considered for service.

2. A scheduler as described in claim 1 including a zero level filter mechanism which filters out inactive supergroups, said zero level filter mechanism connected to the zero level generator and the first level generator.

3. A scheduler as described in claim 2 wherein the zero level generator includes a zero level bitmap generator which generates a zero level schedule bitmap which indicates the supergroup to be scheduled for service, the first level generator includes a first level bitmap generator which indicates the group to be scheduled for service, and the second level generator includes a second level bitmap generator which generates a second level schedule bitmap which indicates the connections to be scheduled for service.

4. A scheduler as described in claim 3 wherein the zero level, first level and second level filter mechanism includes a zero level filter encoder, first level filter encoder and second level filter encoder, respectively, which filters out inactive supergroups from the zero level schedule bitmap and encodes the zero level schedule bitmap with inactive supergroups removed, which filters out inactive groups from the first level schedule bitmap and encodes the first level schedule bitmap with inactive groups removed, and which filters out inactive connections from the second level schedule bitmap and encodes the second level schedule bitmap with inactive connections removed, respectively.

5. A scheduler as described in claim 4 including an interface which maintains a zero level active bitmap, a first level active bitmap and a second level active bitmap having only active connections corresponding to the zero level schedule bitmap, first level schedule bitmap and second level schedule bitmap, respectively.

6. A scheduler as described in claim 5 wherein the zero level filter encoder reads the zero level schedule bitmap and ANDS it with the zero level active bitmap to filter out inactive supergroups, the first level filter encoder reads the first level schedule bitmap and ANDS it with the first level active bitmap to filter out inactive groups, and the second level filter encoder reads the second level schedule bitmap and ANDS it with the second level active bitmap to filter out inactive supergroups.

7. A scheduler as described in claim 6 wherein the zero level bitmap generator, first level bitmap generator and second level bitmap generator dynamically generates bits for each supergroup, group and connection, respectively.

8. The scheduler as described in claim 7 wherein the zero level bitmap generator includes a counter for each supergroup which is decremented as a function of an intercell interval, wherein the intercell interval is the time it takes for the server to service a cell, the first level bitmap generator includes a counter for each group which is decremented as a function of the intercell interval, and the second level bitmap generator includes a counter for each connection which is decremented as a function of the intercell interval.

9. A scheduler as described in claim 8 wherein the zero level bitmap generator sets a bit for a supergroup whose counter decrements to zero, the first level bitmap generator sets a bit for a group whose counter decrements to zero, and the second level bitmap generator sets a bit for a connection whose counter decrements to zero.

10. A scheduler as described in claim 9 wherein the zero level bitmap generator, first level bitmap generator and second level bitmap generator each include a rate limiting counter associated with each counter, wherein the bit for the supergroup, group or connection, respectively, is set whenever both the counter and the corresponding rate limiting counter decrements to zero.

11. A scheduler as described in claim 10 wherein the zero level bitmap generator, first level bitmap generator and second level bitmap generator each generate a guaranteed rate bitmap for supergroups, groups and connections, respectively, which receive service before any other supergroups, groups or connections, respectively, in the respective schedule bitmaps.

12. A scheduler as described in claim 11 wherein the zero level bitmap generator, first level bitmap generator and second level bitmap generator proportionately reduce the service to each supergroup, group and connection, respectively, when overbooking occurs and when total bandwidth is less than the line rate.

13. A method for scheduling service of a server comprising the steps of:
identifying groups in a first level generator corresponding to a supergroup and a zero level generator;
identifying a group of connections with the first level generator to receive service from the server;
identifying connections corresponding with the group of connections with a second level generator to receive service from the server;
filtering out inactive groups of connections in regard to the first level generator; and
filtering out inactive connections in regard to the second level generator.

14. A method as described in claim 13 including after the identifying groups step, there is the step of filtering out inactive supergroups of connections in regard to the zero level generator.

15. A method as described in claim 14 wherein the filtering out the inactive supergroups step includes the step of ANDing a zero level schedule bitmap of the zero level bitmap generator with a zero level active bitmap of an interface to filter out inactive supergroups.

16. A method as described in claim 15 wherein the filtering out the inactive groups step includes the step of ANDing a first level schedule bitmap of the first level bitmap generator with a first level active bitmap of an interface to filter out inactive groups.

17. A method as described in claim 16 wherein the filtering out the inactive connections step includes the step of ANDing a second level schedule bitmap of the second level bitmap generator with a second level active bitmap of an interface to filter out inactive connections.

18. A method as described in claim 17 wherein the identifying the groups of connections includes the step of generating dynamically the zero level schedule bitmap, the identifying the group step includes the step of generating dynamically the first level schedule bitmap, and the identifying the connections step includes the step of generating dynamically the second level generator schedule bitmap.

19. A method as described in claim 18 wherein the step of generating the zero level schedule bitmap includes the step of decrementing a counter for each supergroup every intercell interval; the step of generating the first level schedule bitmap includes the step of decrementing a counter for each group every intercell interval; the step of generating the second level schedule bitmap includes the step of decrementing a counter for each connection every intercell interval.

20. An apparatus as described in claim 9 wherein each counter at each level has a different number of bits.

21. An apparatus as described in claim 5 wherein each active bitmap has a bit which is set to 1 when an associated connection is active and is set to 0 when an associated connection is inactive.

22. An apparatus for serving connections comprising:
a server;
a memory in which cells of the connections are stored, said memory connected to the server; and
a scheduler having a schedule bitmap and active bitmaps which indicate which connections are active, the scheduler filters out inactive connections from the schedule bitmap by ANDing schedule bitmap with the active bitmaps, the scheduler schedules when cells of the connections in the memory are to receive service from the server and provides a minimum specified bandwidth to each connection, said scheduler connected to said server.

23. A scheduler for a server comprising:
a first level generator associated with groups of connections;
a second level generator associated with connections corresponding to the groups of connections, said first level generator identifying which connections in the second level generator corresponds to a group in the first level generator that are to be considered for service, said second level generator identifies the connections corresponding to the group to receive service from the server, said second level generator in connection with said first level generator, wherein connections arise from entities, and including multiple counters associated with each entity which have multiple bits, including multiple schedule bitmaps associated with each entity that are used to schedule connections from the corresponding entity at different priorities or a combination of priorities; and
a first level filter mechanism which filters out inactive groups of connections, said first level filter mechanism connected to the first level generator and the second level generator.

* * * * *